May 26, 1931.　　　B. F. ALDRICH　　　1,806,927
WING CONTROL FOR AIRCRAFT
Filed May 14, 1930
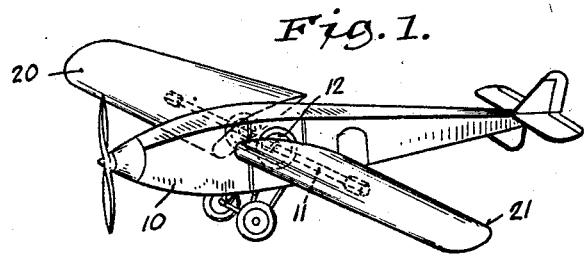
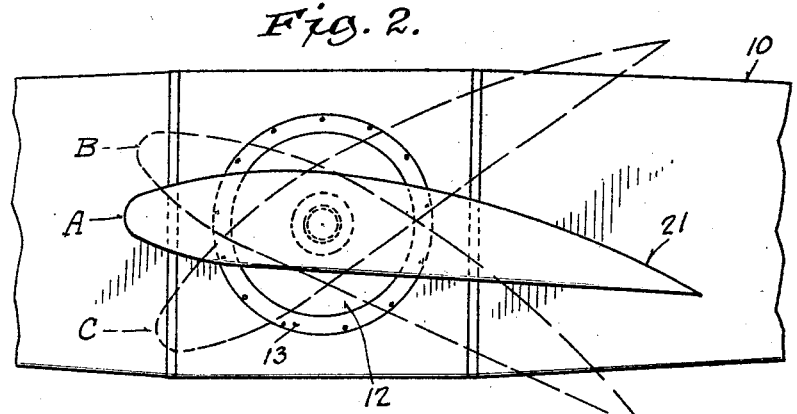
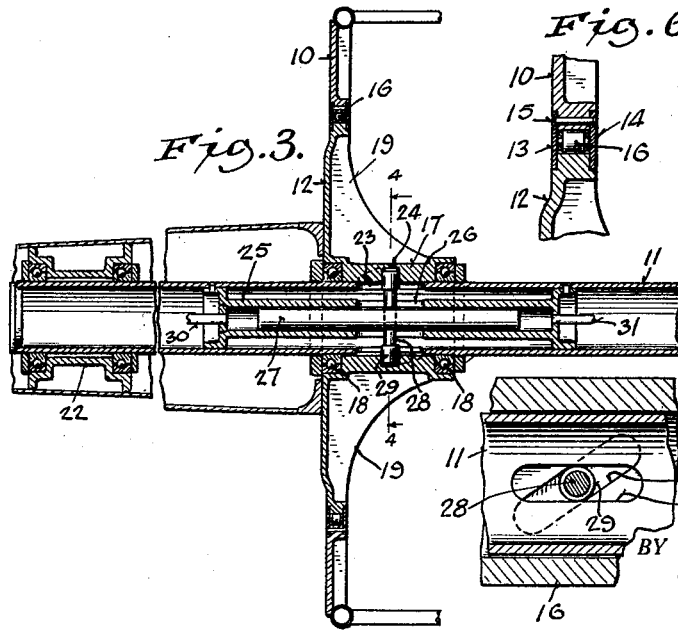
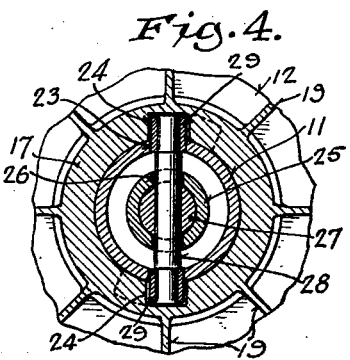
INVENTOR.
Benjamin F. Aldrich
BY
W. F. Woolard
ATTORNEY.

Patented May 26, 1931

1,806,927

UNITED STATES PATENT OFFICE

BENJAMIN F. ALDRICH, OF MILWAUKEE, WISCONSIN, ASSIGNOR OF ONE-HALF TO EDWARD M. CAREY, OF MILWAUKEE, WISCONSIN

WING CONTROL FOR AIRCRAFT

Application filed May 14, 1930. Serial No. 452,455.

This invention relates to aircraft, and resides in an improved construction of means the purpose of which is to enable the variable angular relation of the wings or planes to the fuselage to be more effectively and certainly controlled, as will hereinafter be more clearly set forth.

The fuselage is provided with a fixed transversely extending tubular shaft upon which the wings are mounted for partial rotation in response to positively acting cam mechanism.

Each wing is provided with a hub fixed thereon and having opposite cam slots extending in the direction of the axis of the hub, but disposed helically or angularly with relation to the latter.

A fluid pressure cylinder and a piston operating therein are arranged within the tubular shaft, and the piston carries a cross head which latter is guided so as to restrain the movements of the piston to simple reciprocations, and prevent rotation thereof in such reciprocations.

The opposite ends of the said cross head which project beyond the guides provided therefor, are engaged in the said opposite cam slots with which the hub is provided, so that in the reciprocations of the piston, the hub and its attached wing are given a movement of partial rotation.

Having thus outlined the nature and purposes of my invention, I will now describe in detail the foregoing and other features residing therein, and will point out the novelty in the appended claims.

In the accompanying drawings:

Figure 1 is a perspective view of an aircraft, of the monoplane type, to which my improvement has been applied.

Fig. 2 is a view in elevation at the left side of the fuselage of an aircraft showing the normal position of a wing, viewed longitudinally of the latter, and also, in dotted lines, the variable positions to which the wing may be moved.

Fig. 3 is an enlarged transverse vertical sectional view through part of the aircraft, and longitudinally of the fixed transversely extending tubular shaft, together with the pressure cylinder mechanism arranged therein, and the operating parts associated therewith.

Fig. 4 is a transverse sectional view on the line 4—4, Fig. 3, showing in further detail the arrangement of some of the parts.

Fig. 5 is a view on a horizontal sectional line through the tubular shaft above mentioned and the partially rotatable hub to which the wing is attached, and illustrating the operation of the positively acting cam mechanism.

Fig. 6 is an enlarged view in the plane of Fig. 3, showing more clearly the manner of mounting the hub of the wing in rotating position at the side of the fuselage.

In the drawings, the numeral 10 indicates the fuselage of an aircraft of usual or other construction. A tubular shaft 11, is passed transversely through the fuselage and mounted therein so as to maintain a fixed position therein. The said shaft projects laterally from each side of the fuselage for a distance appropriate to the purposes of my invention, the general arrangement of such tubular shaft 11 being indicated in dotted lines in Figs. 1 and 2. The sides of the fuselage at opposite points are cut away to provide large circular openings, in which are arranged circular discs 12, the diameter of the said discs being less than that of the large circular openings to provide an annular opening separating the parts. The side margins of the discs 12, and the corresponding margins of the sides of the fuselage bordering the circular openings are cut away so as to form circular steps or seats, for the reception of opposite locking rings 13 and 14. The depth of the circular seats is such as to produce flush surfaces when the locking rings 13 and 14 are placed therein. Such locking rings are preferably secured to the sides of the fuselage by bolts or rivets 15, passed through and uniting the parts, thus forming a guiding channel for the peripheral tongue or rib of the disc 12, in the partial rotation of the latter, and also means for resisting any deflection of the discs under pressure of the air upon the wings of the aircraft.

An approval anti-friction bearing 16 is arranged in the annular space bounded by the separated margins of the disc 12, the wall of the large circular opening, and the locking rings 13 and 14, to receive the resistance offered by the wall of the circular opening. The disc 12 is provided upon one side with an inwardly extending hub 17, which receives the tubular shaft 11. Antifriction bearings 18 are arranged in the opposite ends of the hub.

As so mounted, the disc 12 and its connected hub 17, can rotate freely and without friction upon the tubular shaft 11, and also in the circular opening in the side of the fuselage. A plurality of radial webs, indicated 19, connect the disc with the hub, and support the disc against deflection by any strain to which the disc may be subjected.

Wings or planes 20 and 21 are permanently connected to the discs 12 at each side of the plane. At the outer opposite ends of the tubular shaft 11, and at a point about midway in the length of the plane, a second anti-friction bearing 22 is arranged, so that the wings are supported for partial rotation about the shaft 11, by two anti-friction bearings which are spaced a considerable distance apart on the said tubular shaft. The tubular shaft 11 should have its stresses determined, so that deflection of the wings under atmospheric resistance cannot take place.

The part of the shaft 11 which is enclosed by the hub 17, is provided with opposite longitudinally extending through slots 23. The inside of the hub 17 is provided with oppositely extending angular or helical slots 24, the relation to the slots being indicated in Fig. 5. Arranged within the tubular shaft 11, is a fluid pressure cylinder 25 having in its wall at its middle, opposite longitudinally extending through slots 26, in register at all times with the slots 23 in the tubular shaft 11.

A balanced piston 27 is disposed in the pressure cylinder 25. The said piston is perforated transversely at its middle length for the reception of a crosshead 28, fixed therein, the opposite ends of which pass through the slots 26 of the cylinder and the slots 23 of the tubular shaft, and into engagement with the angular or helical slots 24 in the hub. In the reciprocations of the piston 27, the slots 23 and 26 act to impart a right line movement to the cross head and prevent any movement of rotation thereof. Consequently, in such reciprocations of the piston 27, the movement of the ends of the cross head 28 in following the path provided by the slots 24 in the hub 16, will cause the hub 16, the disc 12, and the attached wing to be rotated in one direction or other, as influenced by the movement of the piston. The fluid upon which pressure is exerted, fills the opposite ends of the cylinder, and as pressure in one end is increased, and relaxed in the other, the piston will be moved accordingly, with the result that a movement of partial rotation is imparted to the wing or plane. The ends of the cross head 28 which engage the opposite angular or helical slots 24 in the hub 17 may be provided with wear-resisting sleeves 29, or other anti-friction devices.

The character of the tubular shaft 11 is such as to give a firm support for the wing motors, if the latter be employed. Ducts 30 and 31, between a suitable pump and the opposite ends of the cylinders 25, only one of which is shown, pass the fluid to and from the latter, as may be desired by the pilot of the aircraft, the valves for controlling the movement of the fluid into and out of the cylinders, being subject to his easy control in regulating the extent and effect of the flow.

Fig. 2 indicates diagrammatically the range of movements of partial rotation which may be communicated to the wings, either separately or in unison. In the said Fig. 2, the normal approximate flying position of the wing is indicated by the letter A. By rocking the wing to the extreme upper position indicated by the letter B, a very rapid ascent may be effected within a comparatively short disance. This latter position is also the one assumed by the wings of the aircraft when making a descent, as in such position, the wings exert a powerful braking effect upon the speed of the aircraft, so that the latter may be made to land safely by an almost vertical descent at the termination of its flight. By employing wing motors, and rocking the wings toward the position indicated by the letter B, such motors tend to lift the aircraft, while the main motor pulls straight ahead, the component action of the motors maintaining the fuselage on a level keel. By turning the elevators down, with the wings in the B position, the aircraft will assume and travel in an inclined position, and present a good fighting position. A rapid descent may be effected by rocking the wing to the lower position indicated by the letter C. In banking, one wing may be tilted, causing the corresponding side of the aircraft to raise or lower, depending on whether the front edge of the wing is raised or lowered. In straight-away flying, with one wing tilted down and the other up, and the elevators and rudders in neutral position, the aircraft will rotate upon its longitudinal axis while in flight.

The simplicity of the construction and the positive cam action permits the various positions of the wings to be controlled with perfect ease. It is a great structural advantage to arrange the wing actuating devices within the transverse tubular shaft, and to actuate the wings by means operating in the axial line of the shaft on which the wings are mounted for partial rotation.

Having thus described my invention, what

I claim and desire to secure by Letters Patent of the United States, is:

1. Aircraft provided with wings mounted for partial rotation, comprising a fuselage, a transversely extending tubular shaft supported by the fuselage and forming the support for the wings, and means located within the shaft for rocking the wings about the shaft.

2. Aircraft provided with wings mounted for partial rotation, comprising a fuselage, a transverse tubular shaft carried by the fuselage and extended from the sides thereof to form a support for the wings, and means located within the shaft for rocking the wings about the shaft.

3. Aircraft provided with wings mounted for partial rotation, comprising a fuselage, a transversely extending tubular shaft fixed therein with the wings journaled for rotation on the said shaft, and means located within the shaft for rocking the wings.

4. Aircraft provided with wings mounted for partial rotation, comprising a fuselage and a transversely extending tubular shaft supported thereby, a hub journaled on the shaft and attached to the wing, cam slots in the said hub, and means within the said shaft for engaging the cam slots to effect the partial rotation of the wing.

5. Aircraft provided with wings mounted for partial rotation, comprising a fuselage and a transversely extending tubular shaft supported thereby, a hub journaled on the shaft and attached to the wing, cam slots in the said hub, and a sliding cross head within the said shaft for engaging the cam slots, with means for moving the cross head to effect the partial rotation of the wing.

6. Aircraft provided with wings mounted for partial rotation, comprising a fuselage with opposite openings in its side and a transversely extending tubular shaft supported by the fuselage, a hub journaled on the shaft and having a disc attached thereto guided for rotation in an opening in the side of the fuselage, a wing connected to the disc and hub to rotate therewith, and means within the shaft acting on the hub to effect partial rotation of the wing.

In testimony whereof, I have signed my name at Milwaukee, Wisconsin, this 2nd day of November, 1929.

BEN. F. ALDRICH.